United States Patent [19]

Bokelmann

[11] 4,421,468

[45] Dec. 20, 1983

[54] FOAM MOLDING MACHINE

[75] Inventor: Horst Bokelmann, Grönenbach, Fed. Rep. of Germany

[73] Assignee: Metzeler Schaum GmbH, Munich, Fed. Rep. of Germany

[21] Appl. No.: 379,293

[22] Filed: May 18, 1982

[30] Foreign Application Priority Data

May 22, 1981 [DE] Fed. Rep. of Germany ....... 3120519

[51] Int. Cl.³ .............................................. B29D 27/04
[52] U.S. Cl. .................................. 425/143; 264/40.6; 264/51; 425/145; 425/817 R
[58] Field of Search .................. 425/143, 145; 264/51, 264/40.6; 428/817 R

[56] References Cited

U.S. PATENT DOCUMENTS 3,733,059  5/1973  Pettit .............................. 425/143 X
3,865,912  2/1975  Rosenkranz et al. ........... 425/143 X
4,246,214  1/1981  Osswald et al. ...................... 264/51
4,359,436  11/1982 Henderson et al. ............ 425/143 X

FOREIGN PATENT DOCUMENTS 2820802 11/1979 Fed. Rep. of Germany .

*Primary Examiner*—Philip E. Anderson
*Attorney, Agent, or Firm*—Herbert L. Lerner; Laurence A. Greenberg

[57] ABSTRACT

Foam molding apparatus, including a rotatable table, a plurality of molds disposed on the table, a device for heating and cooling each of the molds, a device being fixed in place relative to the table for filling a specific quantity of foamable reaction mixture having several components into each of the molds, a device for opening and closing each of the molds, a first computer connected to the opening and closing device and to the heating and cooling device for opening and closing each of the molds in dependence on the position thereof and for controlling the heating and cooling of each of the molds in dependence on time, and a second computer connected to the filling device for controlling the filling device in dependence on the position of the molds.

6 Claims, 5 Drawing Figures

FOAM MOLDING MACHINE

The invention relates to a foam molding apparatus including a plurality of molds disposed on a rotatable table, heating and cooling devices for each mold, and a stationary device for filling a specified quantity of foamable reaction mixture having several components, into each mold.

Such a foam molding machine is described in German Published, Non-Prosecuted Application DE-OS No. 28 20 802, and includes several molds disposed on a rotatable table or turn table, heating and cooling devices for each mold, as well as a stationary device for filling in a specified quantity of a foamable reaction mixture formed of several components, into each mold.

As the table is rotated, the individual molds move into the filling position, at which the foamable reaction mixture is filled in. Thereafter, the molds are closed, first heated by steam, and subsequently cooled by water which is under positive pressure. The individual work operations are manually initiated, so that the working speed of this foam molding apparatus is not very great. Furthermore, in general, it is not possible to fill the different molds with different reaction mixtures in a foam molding apparatus of this type.

It is accordingly an object of the invention to provide a foam molding apparatus which overcomes the hereinafore-mentioned disadvantages of the heretofore-known devices of this general type.

A foam molding apparatus is especially proposed which operates auromatically to a great extent, and also has the capability of filling the molds with varied reaction mixtures.

With the foregoing and other objects in view there is provided, in accordance with the invention, a foam molding apparatus, comprising a rotatable table, a plurality of molds disposed on the table, means for heating and cooling each of the molds, means being fixed in place relative to the table for filling a specific quantity of foamable reaction mixture having several components into each of the molds, means for opening and closing each of the molds, first computer means connected to the opening and closing means and to the heating and cooling means for opening and closing each of the molds in dependence on the position thereof and for controlling the heating and cooling of each of the molds in dependence on time, and second computer means connected to the filling means for controlling the filling means in dependence on the position of the molds.

In accordance with another feature of the invention, the first and second computer means are slave computers, and there are provided master computer means connected to the slave computers for controlling the slave computers.

In accordance with a further feature of the invention, there are provided air cushions being disposed below each of the molds and being connected to the first computer means for controlling filling and emptying of the air cushions.

In accordance with an added feature of the invention, there are provided means being disposed in vicinity of the table and being connected to at least one of the computer means for indicating an angular position of the table by generating pulses representing the angular position of the table and for initiating functions of the apparatus corresponding to the position of the table.

In accordance with an additional feature of the invention, the filling means includes a separate metering pump for dispensing each of the reaction mixture components, a clutch connected to the metering pumps, and a continuously rotatable motor connected to the clutch.

In accordance with again another feature of the invention, each of the metering pumps includes a stepping motor being connected to the second computer means and having a vernier adjustment being controlled by the second computer means.

In accordance with a concomitant feature of the invention, the filling means includes a mixing head for mixing the reaction mixture components together, and valves connected between the metering pumps and the mixing head, the valves being connected to and controlled by the second computer means.

The advantages obtained through the use of the invention are, in particular, that the various operational steps of each mold, i.e. the opening and closing and the heating and cooling, are performed automatically by means of a first computer, whereby the mold is closed when a specified position is reached, generally being immediately after filling. After a specified time delay, the heating of the mold is then effected by steam, and maintained for a specified time span. Thereafter, when reaching a specified second position, the mold is opened again, and subsequently the cooling is initiated in dependence on time. The cooling is ended when the mold reaches a specified position further on.

These measures can be independently specified for each mold on the machine table so that each mold can be individually controlled.

The position-dependent control of the filling device is effected by means of a second computer, which regulates the metering pumps of the various components of the foamable reaction mixture. After the setting of the metering pumps is completed, the filling process is started, and the mold which is in the filling position is filled with the proper mixture, according to a "recipe setting".

In this way a capability is provided for changing to the next mixture setting or recipe setting while the filling operation continues by readjusting the metering pumps even during the filling operation.

According to a preferred embodiment, a master computer is provided which controls the process outside of the table, and is disposed in the system at a higher level than the two other computers. The main function of the master computer is to coordinate all of the process steps, and to manage all variable parameters required for the process. By means of these process parameters, the master computer has to perform control functions and switching operations at the right moment in time, and must transfer the corresponding data to the two other computers, so that these can also perform their control and switching functions.

For example, if a table includes 24 different molds as a maximum, 24 different molded parts can be produced, for example, with various filling times, heating times, cooling times, and with various mixtures.

Other features which are considered as characteristic for the invention are set forth in the appended claims.

Although the invention is illustrated and described herein as embodied in a foam molding apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
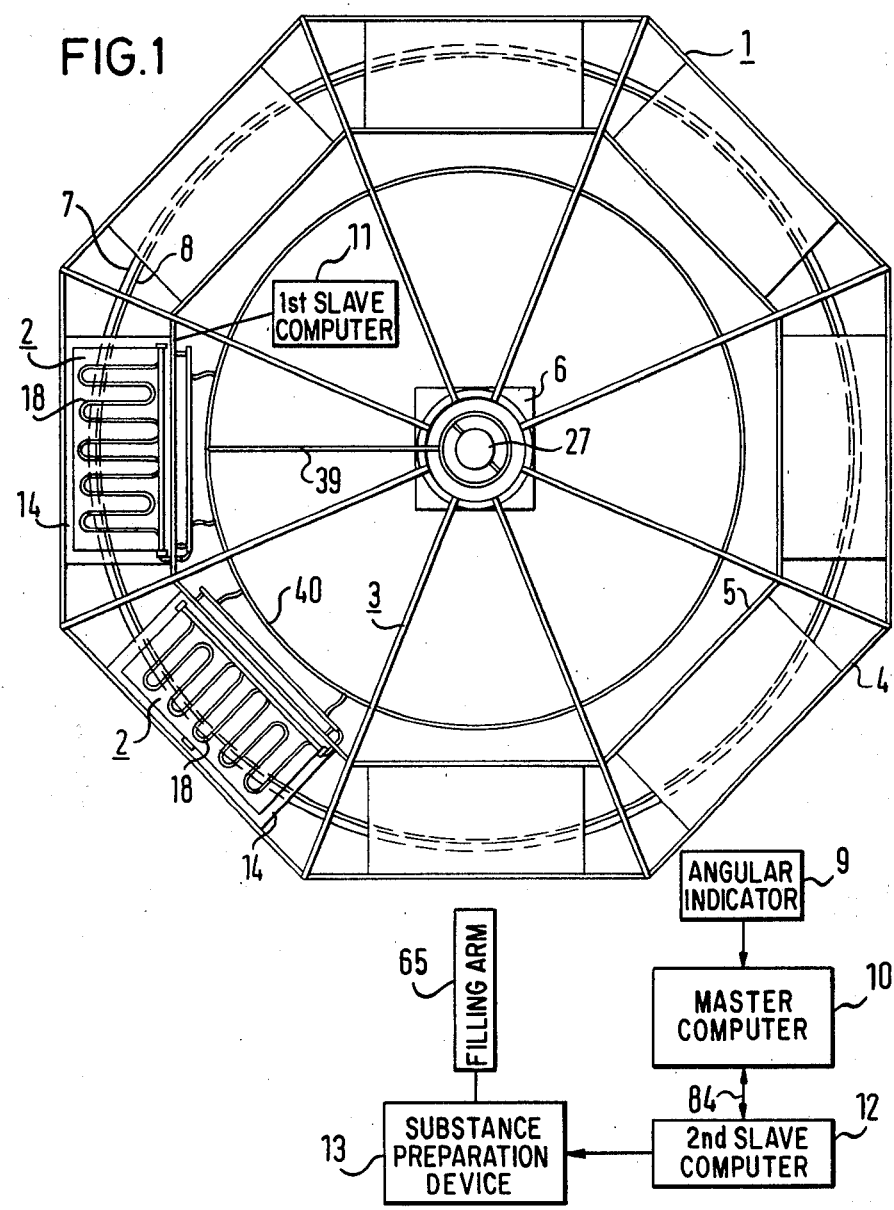
FIG. 1 is a diagrammatic top plan view and schematic block circuit diagram of a foam molding apparatus with some of the molds.

Referring now to the figures of the drawing and first particularly to FIG. 1 thereof, there is seen a foam molding apparatus which includes a symmetrical table, such as an octagonal table 1, which is provided at its outer circumference or periphery with eight molds 2. However, as required, the table can also be equipped with a greater or lesser number of molds, such as six or twelve molds, for example.

Essentially, the table 1 has a star-shaped basic frame 3 with suitable cross members 4 and 5, and a central intersection plate 6. A circular rail 7 having internal gear teeth 8 at the inside of the rail 7 is provided at the outer bottom of the basic frame 3, approximately below the molds 2. This rail 7 is disposed on several rolling wheels which are held by supports that are anchored to the foundation; the rail 7 is driven by a motor having a drive pinion which engages the internal gear teeth 8, so that the table 1 can rotate at a specified speed.

Figure 4:
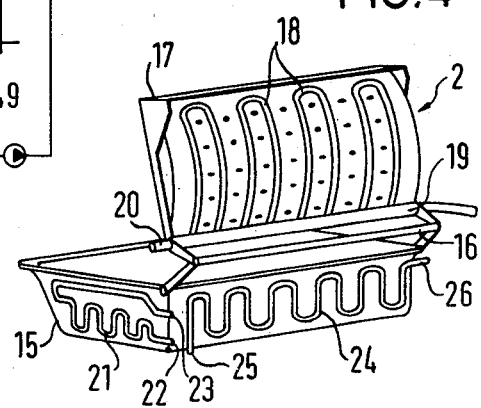
FIG. 4 is a diagrammatic perspective view of a mold, as seen from the back in the opened condition, and also showing the cooling tubes.

On the upper surface of the basic frame 3, at its outer circumference, a corresponding number of holding frames 14 are provided for holding the actual molds 2. As shown in FIG. 4, the molds 2 are formed of two parts, i.e. a lower part 15, which is connected in a hingable manner by joints 16 to a cover part 17.

The surface of every side of the mold 2 is provided with cooling tubes 18 which are connected at one end with a central inlet line 19, and at the other end with a covered outlet line 20. An additional cooling tube 21 with an inlet 22 and an outlet 23 is provided at the illustrated lateral surface of the lower part 15, and another cooling tube 24 with an inlet 25 and an outlet 26 is provided at the back of the lower part 15.

Figure 3:
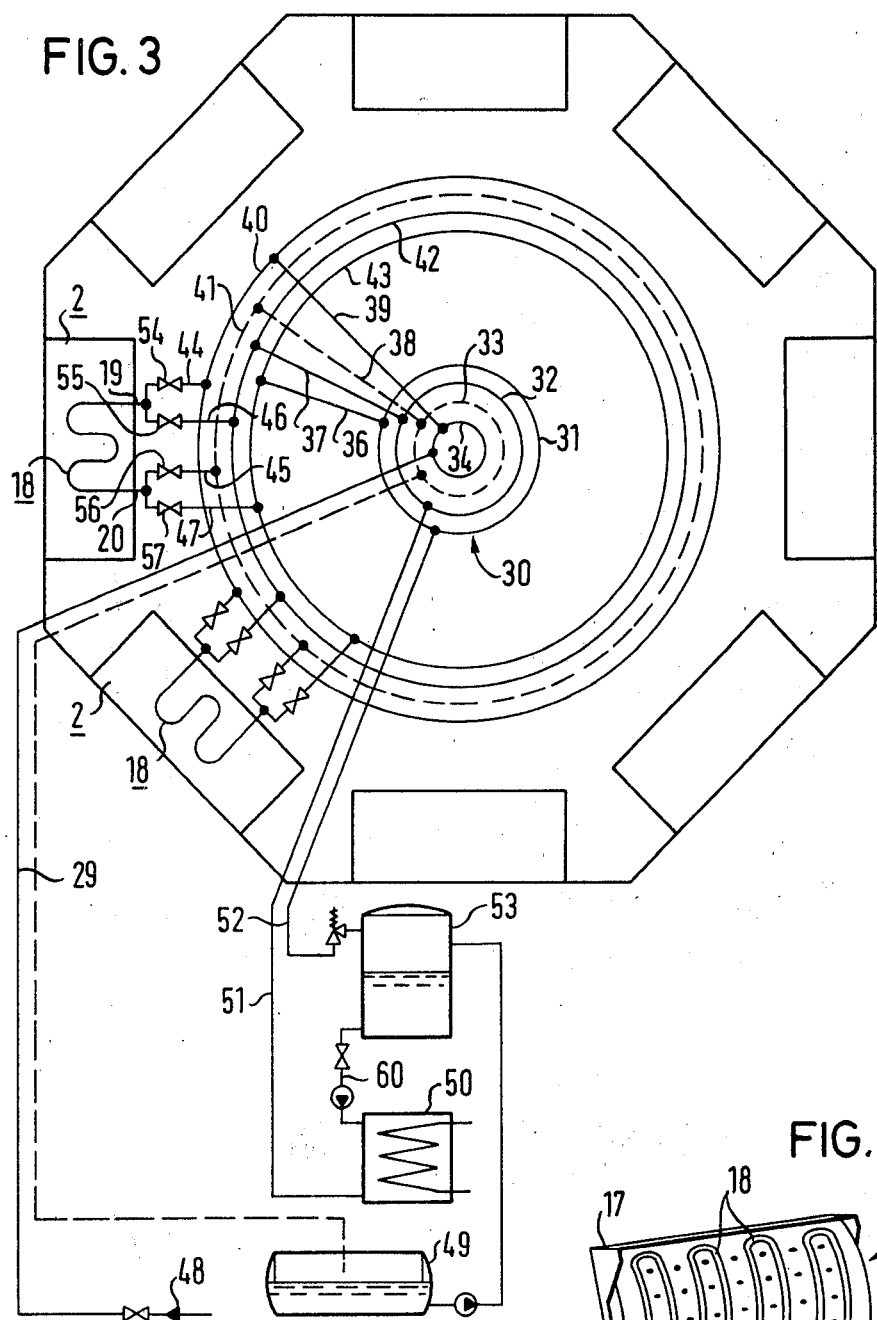
FIG. 3 is a diagrammatic and schematic view showing the basic scheme of the supply and outlet lines for the heating and cooling media with the corresponding external support apparatus.

The molds 2 and their cooling tubes 18, 21 and 24, respectively, are alternatingly supplied with steam for heating or with cooling water for cooling. The different working media are supplied and discharged by a central distribution head 27 located in the rotational axis of the table 1, as shown in FIG. 1. The distribution head 27 includes a fixed lower part containing supply and discharge lines 29 which are shown in FIG. 3 but not further illustrated, and an upper part which rotates with the table 1, from which the individual lines originate. In this distribution head 27, the pressure and liquid density transfer from the fixed to the rotating system in effected. In the illustrated embodiment in FIG. 3, the upper part 30 is surrounded by four circular lines 31, 32, 33 and 34 which lie on top of each other, and which are connected to distributor lines 40 to 43 through radial connecting lines 36 to 39 which lie within the molds 2 on top of each other. From the distributor lines 40 to 43, suitable connecting lines 44 and 47 lead to the corresponding inlets and outlets of the cooling tubes of the molds 2.

Furthermore, a first computer 11 which is only schematically shown in FIG. 1, is located on the machine table 1; this computer controls the opening and closing as well as the heating and cooling of the molds 2, as will also be explained further on.

Figure 2:
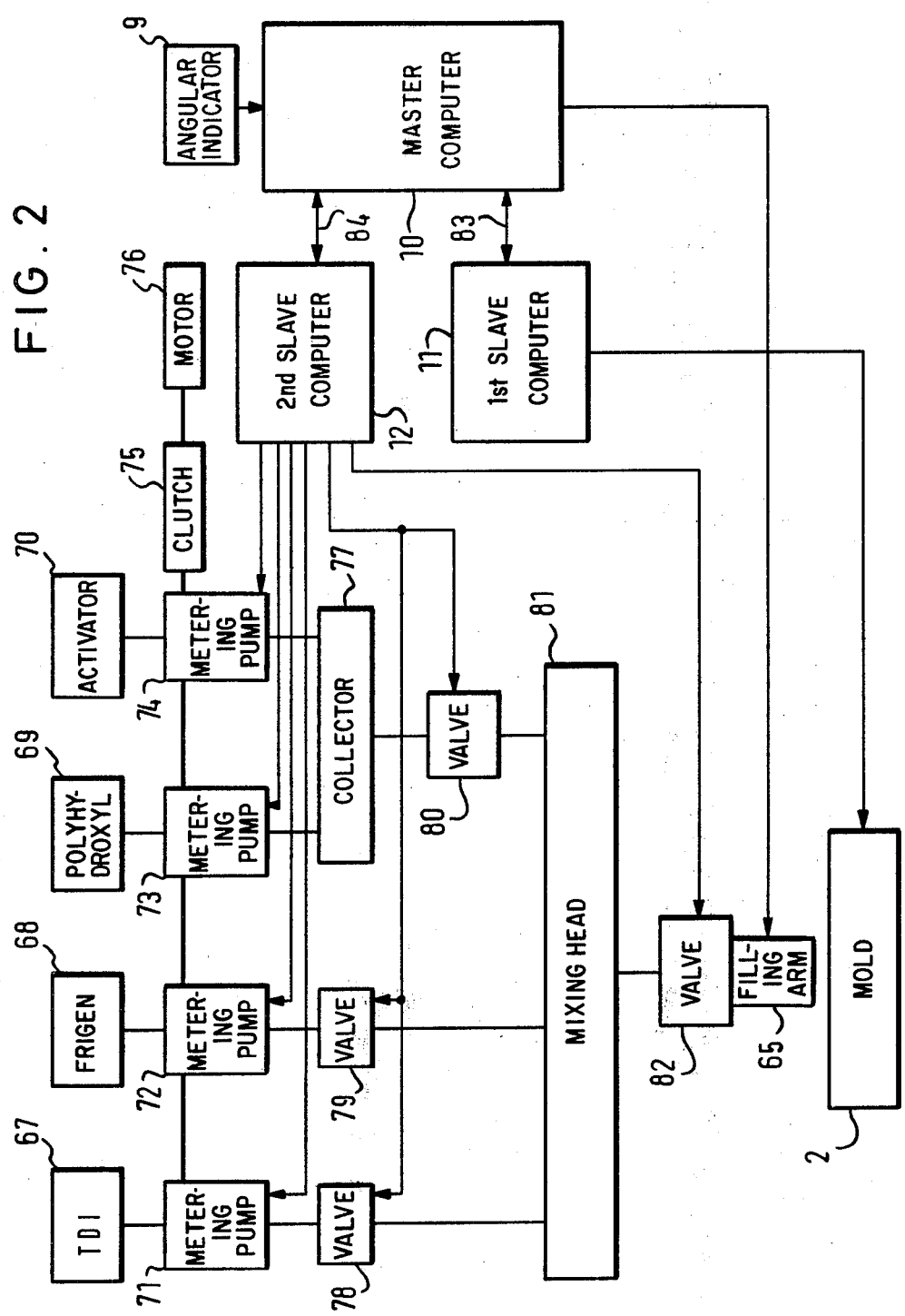
FIG. 2 is a diagrammatic and schematic block circuit diagram of the basic scheme of the three computers and the components of the foam molding apparatus which must be controlled.

A stationary filling arm 65 is disposed outside the rotatable table 1, which is disposed above the open mold 2 that has reached the filling position; the filling arm 65 is connected to a substance preparation device 13, which will be explained later. The substance preparation device 13 is controlled by a second slave computer 12. The two slave computers 11 and 12 are subordinated to a master computer 10, as shown in FIG. 2, for example. The master computer 10 is connected to an angular position indicator 9, which can be constructed in the form of a non-contacting impulse generator, that gives a specified number of counting pulses per revolution to the master computer, such as 1024 (0 . . . 1023) pulses. These counted pulses are added, and thus the number of counted pulses indicates the angular position of the table.

The count is again set to "0" by a second pulse generator per revolution, which means it is synchronized. Each time the master computer 10 receives a counting pulse, an interrupt command is triggered which forces the computer to interrogate a production program table if certain switching operations should be executed, or if control commands should be given to the first or the second slave computer 11, 12, respectively, so that they can perform their assigned switching functions.

The connection between the first slave computer 11 which travels on the rotary table 1 and the master computer 10, is effected by slip rings, which are not further shown.

In FIG. 3, the cycle of the various heating and cooling media is schematically and diagrammatically illustrated. Steam for heating flows from a steam source 48 which is not further explained, through one of the stationary lines 29, and through the central distribution head 27 into the circular line 34. From the circular line 34, the steam flows through the radial connection line 39 and into the distributor line 40, from which the steam is conducted through the corresponding connection lines 44 of the individual molds 2 to the inlet 19 of the cooling tube 18. Steam condensate flows back from the cooling tube 18 through the outlet line 20, the connection line 45, the distributor line 41, the radial connecting line 38 and the ring line 33 into a condensate collecting vessel 49, from which the condensate is again fed into the system as steam 48 from a non-illustrated boiler.

For the sequentially following cooling operation, the cooling water flows from a cooler 50 through a connecting line 51 and the distribution head 27 into the ring line 32. From the ring line 32, the cooling water flows through the radial connecting line 37 into the distributor line 42, and through the connecting line 46 to the same inlet line 19 of the cooling tube 18, whereby the mold 2 is cooled in the required manner. The heated cooling water leaves the cooling tube 18 through the outlet line 20, the connection line 47, the distributor line 43, and the radial connection line 36. The cooling water then flows through the ring line 31 and a return flow line 52 into the cooling water collection tank 53, where it is conducted through a line 60 to the cooler 50 in which it is cooled again, and thereafter reintroduced into the circuit.

As shown in FIG. 3, each connection line 44 to 47 is provided with its own cut off valve 54 to 57, respectively. These valves are controlled in dependence on time, as will be explained later in the text.

FIG. 2 shows the basic scheme of the whole system, i.e. three computers 10, 11 and 12, and the components controlled by these computers. They relate on one hand to the mold 2, and on the other hand to the substance preparation device 13, as shown in detail in FIG. 2.

The substance preparation device 13 contains several containers for the components of the reaction mixture for the foam. For example, the figure shows one container 67 for TDI, one container 68 for Frigen, one container 69 for polyhydroxyl and a container for an activator. For example, a hot foam can be produced from these starting components. Obviously, additional or other components can also be used.

Each container 67 to 70 is connected to a metering pump 71 to 74, respectively, which are each connected by a clutch 75 to a continuously running motor 76. By disengaging the clutch 75, the drive connection can be interrupted. With the clutch engaged, the metering pumps 71 and 74 run continuously.

The metering pumps 71 to 74 are connected to stepping motors which are not shown in detail, but which control the vernier setting of the metering pumps 71 to 74 according to the command given by the second slave computer 12.

For example, the metering pumps 71 and 72 transport TDI and Frigen, respectively, through valves 78 and 79 to a mixing head 81, while the metering pumps 73 and 74 conduct the polyhydroxyl and the activator, respectively, to a collector 77 and from there through a valve 80 to the mixing head 81. The filling arm 65 is connected to the outlet of the mixing head 81 through an additional valve 82, so that the prescribed mixture in the mixing head 81 is always filled into the mold 2 which is positioned below the filling arm 65.

The valves 78, 79 and 82 are also controlled by the second slave computer 12.

Connecting lines 83 and 84 between the master computer 10 on one hand, and the first and second slave computers 11, 12, respectively, on the other hand, are diagrammatically indicated by the arrows.

Figure 5:
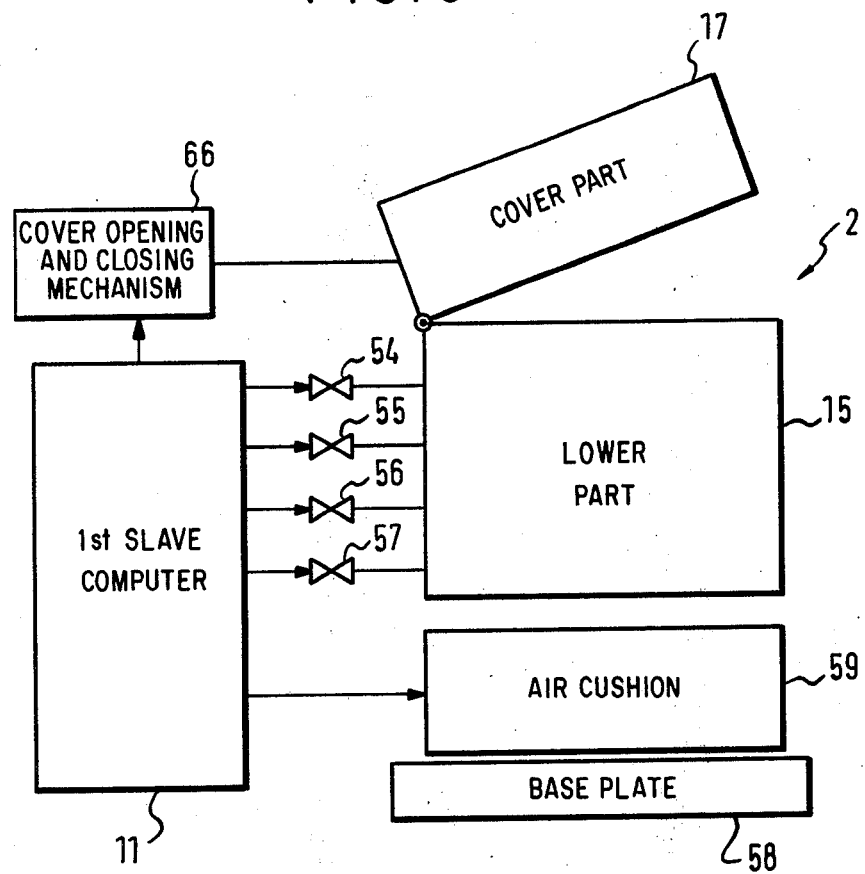
FIG. 5 is a diagrammatic and block circuit diagram of the basic scheme of a mold, and the first computer which controls it.

In FIG. 5, the first slave computer 11 and a mold 2 with the lower mold part 15 and the cover part 17, are shown diagrammatically. An air cushion 59 which lies on a base plate 58 is provided below the lower part 15. Furthermore, the various shut off valves 54 to 57 for the heating and cooling media which are controlled by the first slave computer 11 are indicated. Finally, a mechanism 66 is shown which serves for opening and closing the cover 17 of the mold 2.

The functions of the foam molding apparatus will be explained below.

As already mentioned above, the master computer 10 regulates the process occuring outside the machine table 1, and also controls the two slave computers 11 and 12.

The main function of the master computer 10 is to coordinate all process steps, and to monitor and manage all variable parameters required for the process. By means of these process parameters, the computer 10 must execute control functions and switching operations at the right moment in time, and transfer control commands to the two slave computers 11 and 12, so that they can also perform their control functions and switching operations.

The external process of such a rotating table 1 includes the following control functions, which are only carried out by the master computer:

(a) Positioning of the filling arm 65 by means of an input gate signal when the filling position is reached; if the foam molding apparatus has no input signal in the illustrated example, this program portion of the master computer 10 is omitted;

(b) activating the servo-controlled adjustment for the metering pumps 71 to 74 by means of the second slave computer 12, i.e. transfer of the nominal values of the adjustment parameters, and thereafter monitoring whether or not the adjustment was satisfactorily executed;

(c) activating the clutch 75, so that it is engaged for a specific length of time;

(d) blowing out the mixing head 81 after the filling operation is finished;

(e) transfer of control commands to the two slave computers 11 and 12;

(f) receiving counting pulses and "null" pulses, indicating the angular position of the machine table 1; and (g) exercising automatic self control over the master computer 10 itself.

All variable data required for the production process are fed only in to the master computer 10, and stored and processed there. All data required for the production of a molded part are stored in a "form table" (or form register). These form tables can be read in, changed, or even erased by a special dialog program.

From all of these available form data tables, which are stored, for example, in RAM memories, the master computer 10 compiles a production program, which is executed step-by-step once per revolution of the table 1, being triggered by the counting pulses of the angular position indicator 9.

The first slave computer 11 is subordinated to the master computer 10, and controls the inner process, i.e. the process taking place on the machine table 1. The main function of the first slave computer 11 is to receive control commands from the master computer 10, and to execute the corresponding switching operations. The first slave computer 11 receives its control commands exclusively from the master computer 10 so that it requires no additional information.

To control the inner processes, the first slave computer 11 performs time dependent as well as position dependent measures. Position dependent measures are executed at a specified angular position of the table 1, and therefore depend upon the position of the table 1. Time dependent measures are executed at a specified point in time, and are therefore independent of the fact of whether the table is rotating or not.

The interior process is defined by the following switching sequences:

(a) When a certain position is reached the mold 2 is closed, either before the filling or immediately after the filling operation;

(b) immediately after the mold 2 is closed after filling, the air cushion 59 is supplied with air, so that the lower part 15 of the mold 2 is pressed against the cover 17, and the mold is thereby sealed;

(c) the timer (or counter) for a "steam time 1" and a "steam time 2" are started; wherein the delay after which the steam valves 54 and 56 are to be opened is called "steam time 1"; and the "steam time 2" specifies how long the steam valves 54 and 56 are to remain open. Thus, these two measures are time dependent measures;

(d) after reaching a certain position, the air cushion 59 is again de-pressurized, and the mold 2 is subsequently opened;

(e) after reaching a certain position, the cooling of the mold 2 is initiated; and (f) the cooling of the mold is ended when a certain position is reached.

All of these measures for each mold 2 located on the machine table 1 can be independently specified. Thus, each mold 2 can be individually controlled.

In order for the first slave computer 11 to be able to execute these measures, it receives approximately 120 control commands per revolution of the table 1 from the master computer 10 through a system of slip rings.

Each control command is checked for parity errors, over run errors and lock step errors (synchronization errors). Furthermore, a logic test of the transferred parameters is carried out, to ascertain whether or not the data makes sense.

If there are errors detected during the transmission or the logic check, the slave computer 11 acknowledges the correct reception.

If an error is detected an error light goes on, and the master computer 10 is commanded to transmit the control data again. In total, a control command is transmitted three times. If the transfer then is still not correct, the transmission is interrupted and the machine table is stopped.

The main function of the second slave computer 12 is to adjust the setting of the metering pumps 71 to 74. As soon as a mold 2 reaches the filled position, the setting of the metering pumps 71 to 74 is performed, which means that the actual values of the vernier settings of the stepping motors of the metering pumps 71 to 74 are read into the master computer 10 by the angle encoder. Based on the specified nominal values, the master computer calculates the required adjustment values, which are then transmitted to the second slave computer 12. The slave computer 12 then controls the stepping motors and adjusts their vernier settings corresponding to the nominal values.

After the adjustment is made, all actual values are again checked by the master computer 10, and a correction is made, if necessary. During this adjustment, the play in the shafts of the stepping motors is taken into consideration by only approaching the setting in one direction, e.g. from the bottom upward.

After the adjustment is finalized, the filling operation is initiated by opening the valves 78, 79, 80 and 82, and the mold 2 is therefore filled with the corresponding prescribed mixture.

The capability is also provided for adjusting the substance preparation device for the next mixture, while the filling operation is being carried out. For this purpose, the exact time span can be set by means of a so-called "pump preset time", during which the setting for the next specified mixture should be made, before the filling time during that instant runs out.

This measure prevents the occurence of a too sudden change from one mixture to another, so that the mold 2 which is just being filled and the next mold 2 to be filled each accept a part of the mixture change or recipe change.

Only after the adjustment is completed can the filling operation be started. If the same mixture is used for mold after mold, no adjustment of the setting is required; if only the portion of one component is changed, only the corresponding metering pump is adjusted as well.

In the following description, the operation of the foam molding apparatus will be explained.

The point in time for filling a mold is specified by a certain position of the moving mold 2 in relation to the stationary filling arm 65, i.e. the time point for filling can be defined by a specified number of counting pulses generated by the angular position indicator 9. When this number of counted pulses is reached, the mold 2 is within the range of the filling arm 65, and can therefore be filled. When the filling time point is reached, a discharge operation of the mixing head 81 is interrupted.

If the mold 2 is within the filling region, i.e. under the filling arm 65, the filling of the mixture can be performed during a specified time span. The "filling duration" depends mainly upon the density of the mixture used, i.e. the filling for the preceding mold must be interrupted as soon as the next mold moves into position.

If necessary, the second slave computer 12 resets the metering pumps 71 to 74 to the new recipe before the new recipe is filled in. It is only then that the filling arm and accordingly the filling operation are released.

The adjustment of the metering pumps 71 to 74 is effected in such a manner that the required vernier setting can only be approached from one side, i.e. from the lower vernier setting toward the higher setting. If the adjustment to be made is from a greater vernier setting to a smaller one, then this setting is passed downward by one turn, and then again approached upward. In this manner, the play in the spindles of the metering pumps 71 to 74 is equalized.

If several molds are filled with the same mixture or recipe, an adjustment of the metering pumps 71 to 74 is not required. If different molds 2 following each other are to be filled with different mixtures, the preparation of the mixture for the next mold 2 can be started during the filling operation, i.e. before the filling operation is finished, whereby the above-mentioned "pump preset time" is used. This permits a better transition from one recipe to another so that the quantity for the transition from the first recipe to the second is distributed by choice between the two adjacent molds. The exact pump preset time must be empirically determined, and can be different from mold to mold.

After the setting of the metering pumps 71 to 74 is finished, the actual filling operation is performed by coupling the motor 76 to the metering pumps 71 to 74, and by also opening the valves 78, 79, 80 and 82. An exactly specified amount of the foamable reaction mixture is thereby filled into the particular mold 2 which at that moment is in the filling position.

If multiple molds are to be filled, the apparatus is automatically ready for the second and following fillings, respectively, after the first filling is finished. The mixing head is not blown out between the time periods when the device is ready for these filling operations. The mixing head is blown out only after the last filling is done. The readjustment of the pumps is also performed at that time.

After a filling operation is ended, the mixing head 81 is automatically blown out by a device which is not further explained herein; however, this is only done when the mixing head 81 is moved to its end position, i.e. into the suction device. The blowing out of the mixing head takes about 15 seconds, but can be prolonged, if necessary, by manual operation through the use of a switch, known as a blow switch.

The blow out operation is interrupted when the next mold reaches the filling position.

After the filling operation is ended and the filling arm is returned to its end position, the mold 2 is automatically closed by the first slave computer 11. If the filling arm 65 is not in its end position, the mold 2 cannot be closed. This additional measure is necessary for safety reasons.

About 4 seconds after the automatic closing of the mold, the first slave computer 11 applies pressure to the air cushion 59 below the lower part 15 of the mold 2, so that the lower part 15 presses against the cover 17, and thereby seals the mold 2.

After the "steam time 1" which was explained above has elapsed, the valves 54 and 56 are opened for a time span determined by the first slave computer 11, so that the steam flows through the corresponding heating tubes, and thereby heats the mold 2. The valves 54 and 56 remain open during the "steam time 2".

After the mold has reached a specified position, the pressure on the air cushion 59 is relaxed on command from the first slave computer 11, and the cover 17 of the mold 2 is again opened. Subsequently, the valves 55 and 57 are opened, so that the water which is under a positive pressure can flow through the respective cooling ducts, and cool the mold 2. The timing and the duration of this coolant flow is also specified by the first slave computer 11.

When the mold 2 is sufficiently cooled, the finished molded part can be removed. The hereinafore-mentioned cycle starts again when the filling position is reached by another mold.

The master computer 10 can be constructed in such a way that it also serves for data storage. For this purpose, the master computer 10 can generate the following messages, for example:

(a) Production and machine messages including article number, batch number and machine unit number; this message is given out after each filling operation;

(b) disturbance messages, regarding the kind of disturbance, batch identification, number of personnel working at the foam molding apparatus, and unit number. This message is only produced when a machine mulfunctions, and is only generated by the master computer 10 in 10-minute intervals;

(c) actual time diagrams, including the number of personnel working at the unit, batch identification, and machine number. This message is also only produced every 10 minutes.

The required characteristic information, such as the number of personnel, batch identification or disturbance data can be read in by switches. The number of the machine unit should be fixed in the program.

By producing suitable data, the number and type of molded parts produced, and accordingly the productivity of the foam molding apparatus as well, can be monitored very exactly in practice without any time delay.

I claim:

1. Foam molding apparatus, comprising a rotatable table, a plurality of molds disposed on said table, means for heating and cooling each of said molds, means being fixed in place relative to said table for filling a specific quantity of foamable reaction mixture having several components into each of said molds, means for opening and closing each of said molds, means disposed in vicinity of said table for indicating an angular position of said table and said molds by generating signals representing the angular position of said table and for initiating functions of the apparatus corresponding to the position of said table, stationary master computer means disposed outside said table and connected to said indicating means for coordinating operations of the apparatus by receiving said signals from said indicating means and determining time periods based on said angular position, first slave computer means disposed on and rotatable with said table, said first slave computer means being connected to and controlled by said master computer means and being connected to said opening and closing means and to said heating and cooling means for opening and closing each of said molds in dependence on the position thereof and for controlling the heating and cooling of each of said molds in dependence on time, stationary second slave computer means disposed outside said table, said second slave computer means being connected to and controlled by said master computer means and being connected to said filling means for controlling said filling means in dependence on the position of said molds, said filling means including a separate metering pump for dispensing each of the reaction mixture components.

2. Foam molding apparatus according to claim 1, including air cushions being disposed below each of said molds and being connected to said first computer means for controlling filling and emptying of said air cushions.

3. Foam molding apparatus according to claim 1 or 2, wherein said filling means include a clutch connected to said metering pumps, and a continuously rotatable motor connected to said clutch.

4. Foam molding apparatus according to claim 3, wherein each of said metering pumps includes a stepping motor being connected to said second computer means and having a vernier adjustment being controlled by said second computer means.

5. Foam molding apparatus according to claim 3, wherein said filling means includes a mixing head for mixing the reaction mixture components together, and valves connected between said metering pumps and said mixing head, said valves being connected to and controlled by said second computer means.

6. Foam molding apparatus according to claim 4, wherein said filling means includes a mixing head for mixing the reaction mixture components together, and valves connected between said metering pumps and said mixing head, said valves being connected to and controlled by said second computer means.

* * * * *